June 17, 1930. E. W. SHALLOCK 1,764,695
SINTERING MACHINE
Filed Oct. 12, 1928 2 Sheets-Sheet 1
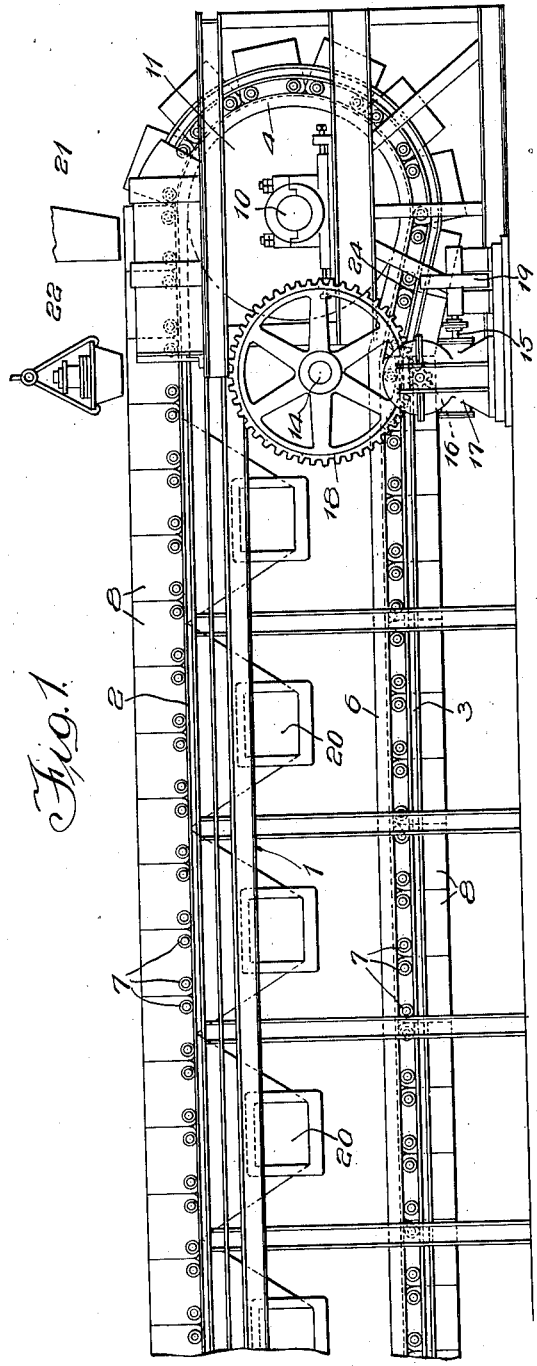
Inventor:
Edward W. Shallock

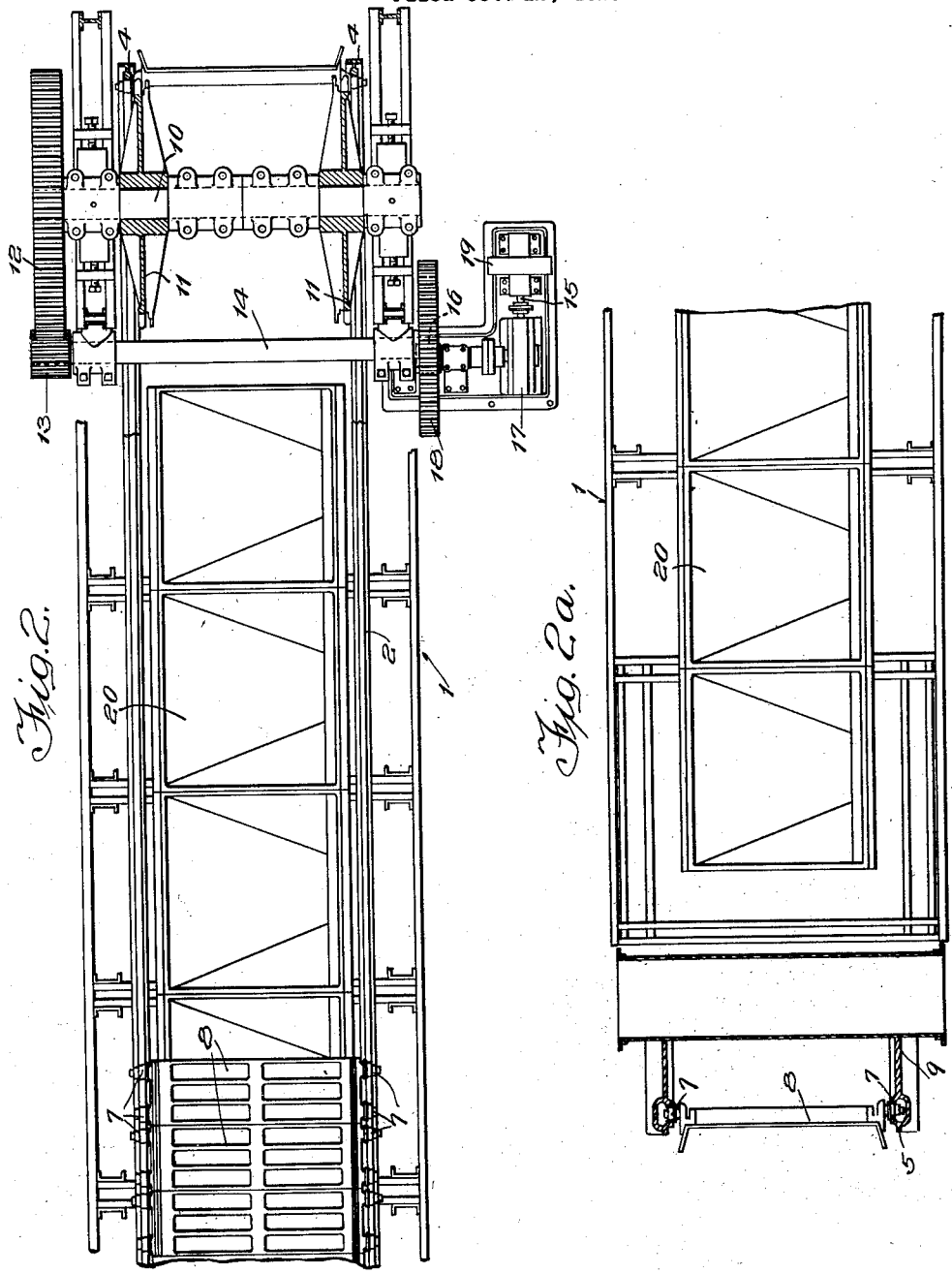

Patented June 17, 1930

1,764,695

UNITED STATES PATENT OFFICE

EDWARD W. SHALLOCK, OF CHICAGO, ILLINOIS, ASSIGNOR TO AMERICAN ORE RECLAMATION COMPANY, OF CHICAGO, ILLINOIS, A CORPORATION OF NEW YORK

SINTERING MACHINE

Application filed October 12, 1928. Serial No. 312,061.

This invention relates to sintering machines, and more particularly to a machine for continuously sintering ore, flue dust, and other finely divided material of like nature.

In sintering machines of the Dwight & Lloyd continuous type, now well known in the art, the material to be sintered is carried by a train of separate pallets that travel upon the upper run of an endless track, for the sintering operation, and then pass down around one end of the machine being thereby inverted to discharge the sintered material, after which they return along the lower run of the track to the opposite or feed end of the machine.

The pallets are elevated to the upper run to receive a fresh charge of material, and the train of pallets is propelled by means at the feed end only of the track, the track being longer than the train of pallets thus leaving an expansion space.

In an earlier type of Dwight & Lloyd machine idler sprockets were provided at the delivery end and the space between the end pallets of the train occurred at the upper end of the return bend at this end of the machine, that is, between the end of the upper run of the track and this return bend which was in the form of a semicircle connecting the delivery end of the upper run of the track to the corresponding end of the lower run of the track. Difficulty was experienced with this machine due to the fact that the pallets had a sudden drop when passing from the upper run of the track to the return bend. As a result, the sinter was broken abruptly due to the sudden change in direction of travel of the pallet and the sudden drop thereof, with the result that pieces of the sinter dropped between the pallets and, unless completely removed, prevented proper spacing of the pallets with the result that the machine would wreck itself. A further objection to this earlier type of Dwight & Lloyd machine was the fact that the pallet in passing about the upper portion of the return bend acquired appreciable velocity and struck the end pallet of the series extending about the lower run of the track and the return bend with such force as to cause breakage of the pallet.

This was particularly true when using heavy pallets. Also, the dropping and striking of the pallets at the delivery end imposed severe stresses upon the idler sprockets, and these stresses were transmitted to the entire machine with resulting damage thereto.

In the later machines of the Dwight & Lloyd continuous type, means are provided whereby the pallets are held in contact and prevented from separating when passing about the return bend of the track at the delivery end thereof. By this arrangement, entry of sinter between the pallets, and striking together of the pallets with resulting damage thereto, is avoided. This improved type of Dwight & Lloyd machine is, however, open to some minor objections when sintering material of certain characteristics. There are many materials, such as flue dust, which contain tarry substances and, when sintered, tend to adhere to the pallets. These materials are not completely discharged from the pallets in the improved type of machine referred to, when the pallets pass about the delivery end of the machine, with the result that the adhering sinter is discharged from the pallets as they pass down the incline of the lower run of the track at the feed end of the machine to be elevated and propelled by the feed sprocket wheels.

It is desirable when sintering materials which tend to adhere to the pallets, to provide means whereby the pallets may be jarred sufficiently to assure separation of the sinter from the pallets before passage of the same about the return bend at the delivery end of the machine. This assures proper discharge of the sinter from the pallet and avoids the necessity of employing an operator to remove the accumulation of sinter beneath the feed end of the machine, referred to, which occurs in the improved type of Dwight & Lloyd machines above discussed.

I have found that by properly relating the upper run of the track and the return bend at the delivery end thereof, it is possible to have the space between the end pallets of the train occur between the upper run of the track and such return bend, as in the earlier Dwight & Lloyd machines above discussed, while avoiding the objections referred to inherent in such earlier machine. It is also possible, by my improved construction, to avoid the use of idler sprockets at the delivery end of the machine, thus relieving the machine of the stresses imposed thereon when such sprocket wheels are used. Also, by my improved construction, I prevent any sudden drop of the pallet when passing from the upper run of the track to the upper end of the return bend at the delivery end, thus eliminating danger of breakage of pallets and also preventing undesirable breaking of the sinter and consequent lodgement of pieces thereof between the pallets.

Further objects and advantages of my invention will appear from the detailed description.

In the drawings:

Figures 1 and 1ª are a side view of a sintering machine constructed in accordance with my invention; and Figures 2 and 2ª are a plan view of the machine, partly broken away and in section, some of the pallets being omitted.

My sintering machine is, in general, of known construction and includes a suitable main supporting frame 1. An endless track is suitably mounted upon this frame and comprises upper and lower runs 2 and 3, respectively, connected by return bends 4 and 5 at the feed end and delivery end, respectively, of the track. Retaining rails 6 are disposed above and adjacent the lower run 3 of the track and retaining rails or elements are associated with the return bends 4 and 5 to hold the rollers 7 of pallets 8 to the track during travel of the pallets about the return bends and along the lower run of the track. The pallets 8 are of known construction and need not be illustrated nor described in detail.

Return bend 5 is illustrated as being formed integrally with an end casting 9 which is suitably secured to the delivery end of frame 1. At the other or feed end of the machine a drive shaft 10 is suitably mounted for rotation and carries a pair of sprocket wheels 11, secured thereon and adapted to elevate the pallets 8 from the lower run of the track to the upper run thereof, and propel the pallets along the upper run. Shaft 10 is rotated by means of a gear 12 keyed thereon and meshing with a pinion 13 keyed on a countershaft 14, this shaft being driven from a pulley shaft 15 which drives a pinion 16, through a suitable transmission 17, this pinion 16 meshing with a spur gear 18 keyed on the other end of countershaft 14. A pulley 19 is secured on pulley shaft 15 and is adapted for reception of a belt driven from a suitable source of power. Obviously, any other suitable or preferred means for driving the machine may be employed.

In the operation of the machine, the pallets 8 travel upon the upper run 2 of the track with their grates or bottoms disposed closely adjacent the tops of hoods or wind boxes 20 disposed beneath the upper run 2, these wind boxes being connected to suitable suction means, in a known manner, so as to produce a down draft through the material on the pallet grates. The material to be sintered is continuously supplied to the pallets by means of a spout 21 supported above the same and communicating with a hopper of a bin or other storage receptacle.

An ignition device 22 of known type is supported above and adjacent the pallets a short distance beyond the spout 21 for igniting the material after it has been deposited in a layer upon the pallet. As the pallets are advanced along the upper run of the track air is drawn downwardly through the material supported by the pallets which is sintered in a manner well understood in the art.

Referring to Fig. 1ª, it will be noted that the return bend 5 at the delivery end of the machine connects directly with the adjacent end of the lower run of the track and is of semicircular shape, the radius of this bend being less than one-half the distance between the upper and lower runs of the track. The upper end of the bend 5 is connected to the upper run 2 of the track by a relatively straight portion or element 23 which is disposed at a slight or gentle inclination downwardly from the upper run of the track to the upper end of the return bend 5. This inclined element or portion 23 of the track is preferably disposed at an angle to the upper run 2 of approximately 14°. It will also be noted that the lower run 3 of the track is disposed horizontally for substantially its full length, being provided at the feed end of the track with a relatively short element or portion 24 extending downwardly from the lower run 3 to the lower end of the return bend 4.

This inclined portion 24 of the track is also preferably disposed at a slight or gentle inclination, at approximately 14°, to the lower run 3. By constructing the track in this manner, the pallets 8 are in contact for the full length of the upper run 2 of the machine and about the return bend 5 and along the lower run 3 of the track, the opening or space in the train of pallets which occurs between the two end pallets of the train being substantially coincident with the inclined portion 23 of the track, such space being designated by 25.

In the operation of the machine, as each pallet reaches the delivery end of the upper run 2 of the track, its speed of travel is slightly accelerated due to the inclined portion 23 of the track and, due to the angular relation of this portion to upper run 2, the sinter is broken along a line between the two end pallets on the upper run of the track. As the angle between upper run 2 and inclined portion 23 is slight, the sinter will be broken cleanly along a line between the two pallets and without breaking off pieces of the sinter which would drop down between the pallets, such as occurs where the change of direction of the pallets leaving the upper run is abrupt, that is, where this pallet moves through a large angle in leaving the delivery end of the upper run of the track.

After the sinter of the end pallet referred to has thus been cleanly broken from the sinter of the succeeding pallet, this end pallet passes down the incline 23 and has its speed slightly accelerated, as noted. This pallet then strikes the uppermost one of the series of pallets extending above the return bend 5 and is thus abruptly stopped. The impact of the pallet which has traveled down the incline 23 is sufficient to effectively loosen the sinter carried thereby so that this sinter is completely discharged from the pallet as it passes about the return bend 5. The inclination of portion 23 of the track, however, is relatively slight, and the travel of the pallets down this inclined portion is comparatively short, so that the pallet traveling down the incline 23 does not strike the preceding pallet with sufficient force to cause injury thereto. The weight of the pallets extending about the return bend 5 is sufficient to feed the pallets along the lower return run 3 of the track uniformly to the incline 24 by means of which the pallets are continuously delivered to the sprocket wheels 11. This avoids the necessity for providing sprocket wheels at the delivery end of the machine, and, by having the lower run 3 of the track free of upgrades, such as are frequently used in sintering machines of this type, hammering or pounding of the pallets on the upgrade, which not infrequently occurs in machines having an upgrade on the lower run of the track, is eliminated.

Also, by provision of the slight or gentle incline 23 complete discharge of the sinter from the pallets at the delivery end of the machine is assured, preventing any accumulation of sinter beneath the machine at the feed end thereof, previously referred to. This is of particular advantage when sintering tarry materials, such as flue dust, which tend to adhere to the grates of the pallets.

What I claim is:

1. In a sintering machine, an endless track, a train of separate pallets traveling upon the track, said track being of greater length than the train of pallets, and means for elevating the pallets and for propelling them along the track to the delivery end thereof, said track having a straight portion inclined downwardly from the upper run of the track to the return bend at the delivery end thereof, the space between the end pallets of the train being substantially coincident with said inclined portion of the track.

2. In a sintering machine, an endless track, a train of separate pallets traveling upon the track, said track being of greater length than the train of pallets, the track having a straight portion inclined downwardly from the upper run of the track to the upper end of the return bend at the delivery end of the track and tangential to the return bend, said inclined portion being substantially coincident with the space between the end pallets of the train, and means for elevating the pallets and for propelling them along the top run of the track.

3. In a sintering machine the combination of an endless track having upper and lower substantially horizontal runs connected by return bends at the feed and delivery ends thereof, the track having a relatively straight portion connecting with and angularly disposed relatively to the upper run of the track, at the delivery end and merging tangentially into the delivery return bend at the upper end of the curved portion thereof, a train of separate pallets traveling upon said track, and means at the feed end of said track for elevating the pallets to the upper run thereof.

4. In a sintering machine, an endless track, a train of separate pallets traveling upon the track, said track being of greater length than the train of pallets and the space between the end pallets of the train being short relative to the length of the train, and means for elevating the pallets and propelling them along the upper run of the track to the delivery end thereof, said track having a straight portion inclined downwardly from the upper run of the track to the return bend at the delivery end thereof, the space between the end pallets of the train being substantially coincident with said inclined portion of the track.

In witness whereof, I hereunto subscribe my name this 3rd day of October, 1928.

EDWARD W. SHALLOCK.